United States Patent
Ishikawa (10) Patent No.: US 6,329,948 B1
(45) Date of Patent: Dec. 11, 2001

(54) METHOD OF DETERMINING POSITION OF WIRELESS COMMUNICATION TERMINAL

(75) Inventor: Seiji Ishikawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/636,570

(22) Filed: Aug. 10, 2000

(30) Foreign Application Priority Data

Aug. 12, 1999 (JP) .................................................. 11-228766
Sep. 13, 1999 (JP) .................................................. 11-258211

(51) Int. Cl.$^7$ ...................................................... G01S 3/02
(52) U.S. Cl. .......................... 342/457; 342/463; 342/465; 342/357.06; 342/357.14; 701/213
(58) Field of Search ..................................... 342/457, 463, 342/465, 357.06, 357.14; 701/213

(56) References Cited

U.S. PATENT DOCUMENTS 5,987,329 * 11/1999 Yost et al. .............................. 342/450
6,009,334 * 12/1999 Grubeck et al. ...................... 455/456
6,249,252 *  6/2001 Dupray ................................. 342/457

FOREIGN PATENT DOCUMENTS 1-206279    8/1989  (JP) .
3-235077   10/1991  (JP) .
5-60853     3/1993  (JP) .
7-154848    6/1995  (JP) .

* cited by examiner

Primary Examiner—Theodore M. Blum
(74) Attorney, Agent, or Firm—Burr & Brown

(57) ABSTRACT

In order to determine a position of a mobile station in a wireless communication system including a plurality of mobile stations each having a wireless communication terminal installed therein, a plurality of base stations and a communication control station, times of receipt at which a radio wave emitted by a wireless communication terminal provided in a mobile station whose position is to be determined are received by at least three base stations substantially synchronized with a standard time are measured, a plurality of representative points are set on a position calculation area within an overlapped portions of cover areas of these base stations, communication delay times at respective representative points are calculated with $[(x-xi)^2+(y-yi)^2]^{1/2}/C$ (C is a velocity of light), wave emitting times TMi are calculated as differences between the times of receipt Ti and the communication delay times, a sum D of squares of differences between two calculated wave emitting times in all combinations of two calculated wave emitting times is calculated, and a position of the mobile station is determined at one of said plurality of representative points which gives a minimum sum.

24 Claims, 7 Drawing Sheets

METHOD OF DETERMINING POSITION OF WIRELESS COMMUNICATION TERMINAL

BACKGROUND OF THE INVENTION

1. Field of the Invention

The present invention generally relates to a wireless communication system including a plurality of mobile stations each having a wireless communication terminal installed therein, a plurality of base stations each having known positions and a communication control station which controls communication between said plurality of wireless communication terminals and said plurality of base stations. More particularly, the present invention relates to a method of determining a position of a wireless communication terminal in the above mentioned wireless communication system.

2. Description of the Related Art

In the wireless communication system of the kind mentioned above, there will be developed a number of applications utilizing a technique for determining a position of a wireless communication terminal, particularly a personal handy-phone system called PHS. Heretofore, a base station system has been proposed as a method of determining a wireless communication terminal. Recently, there has been developed GPS (Global Positioning System) system using a GPS receiver. These two systems have their own merits and demerits. Particularly, in the base station system, in order to attain a sufficiently high precision in the position detection, it is necessary to provide a larger number of base stations. It is apparent that this requires a larger cost in constructing the base stations. If a number of base stations is small, a sufficiently high precision could not be obtained.

In Japanese Patent Application Laid-open Publication Kokai Hei 7-154848, there is proposed a method of determining a position of a wireless communication terminal in the base station system, in which an electromagnetic wave transmitted by a wireless communication terminal installed in a mobile station is received by a base station whose position is known, and a distance from the mobile station to the base station is measured in accordance with a strength of a received signal, and a position of the mobile station is determined on the basis of the thus measured distance.

However, in the method of measuring a distance on the basis of a strength of a received electromagnetic wave, it is difficult to attain a sufficiently high precision for determining a position of a wireless communication terminal installed in a mobile station although it is possible to determine a base station closet to the relevant mobile station. Therefore, in this case, a position of a mobile station can be determined with a unit of communication zones of respective base stations. In order to obtain valuable position information, respective communication zones have to be sufficiently small. Then, a larger number of base stations have to be distributed with a sufficiently high density. This requires a larger cost.

In Japanese Patent Application Laid-open Publications Kokai Hei 1-206279, 3-235077 and 5-60853, there has been proposed a method of measuring a distance between a mobile station having a wireless communication terminal installed therein and a base station is measured by utilizing a propagation delay time. In this method, a signal transmitted by a mobile station is received by at least three base stations positions of which are known and which possess a substantially synchronized time for measuring, and distances from the relevant mobile station and respective base stations are measured on the basis of differences in reception times, and then a position of the mobile station on a plane is determined from the thus measured at least three distances.

In general, a position on the plane is determined by using the hyperbolic navigation. In this hyperbolic navigation, a curve on which a difference in distances measured at two base stations becomes constant is a hyperbolic curve having a foci at these two base stations. Therefore, among three base stations, one base station is selected as a common base station and two sets of hyperbolic curves are derived and a cross point of these two hyperbolic curves is determined as a position of the mobile station. In this case, a called loran diagram may be utilized, but if the base stations are not arranged in accordance with the loran diagram, it could not be utilized. Furthermore, in this known method, it is difficult to take into account of an error in the distance measurement.

It is also possible to determine a position of a mobile station by solving simultaneous ternary quadratic equations, but calculation becomes extremely complicated. The calculation may be simplified by approximating the simultaneous ternary quadratic equations by Tailor expansion. However, such an approximation is limited to a case, in which a distances between the mobile station and the base stations are extremely longer than a traveling distance of the mobile station over which a position of the mobile station must be renewed.

In the GPS method, a position could not be determined any more if electromagnetic waves from GPS satellites high above in the sky could not be received. Therefore, a position could not be determined in buildings, underground and tunnels. Moreover, it is sometimes difficult to determine a position in a city area in which many toll buildings are aligned.

SUMMARY OF THE INVENTION

The present invention has for its object to provide a novel and useful method of positioning a communication terminal with a desired precision even if base stations are distributed at a low density which can be realized easily, and calculation is extremely simplified.

It is another object of the invention to provide a method of determining a position of a wireless communication terminal, in which a position of a mobile station travelling over a wide area can be determined precisely under various conditions by utilizing both the base station method and the GPS method.

It is still another object of the invention to provide a method of determining a position of a wireless communication terminal in a wireless communication system, in which position information obtained by the GPS method can be utilized also in the base station method to simplify calculation process in the base station method.

According to a first aspect of the invention, a method of determining a position of a wireless communication terminal in a wireless communication system including a plurality of mobile stations each having a wireless communication terminal installed therein, a plurality of base stations each being arranged at known positions on a plane and a communication control station controlling communication between said plurality of wireless communication terminals and said plurality of base stations, comprises the steps of:

measuring times of receipt at which a radio wave emitted by a wireless communication terminal provided in a mobile station whose position is to be determined are received by at least three base stations which are substantially synchronized with a standard time;

modifying equations in which products of a velocity of light and differences between an actual wave emitting time at which the radio wave is emitted from the wireless communication terminal of the mobile station and said measured times of receipt become equal to distances between said mobile station and said at least three base stations, into equations by means of which, calculated wave emitting times are derived for each of said at least three base stations by replacing a position of the mobile station by a plurality representative positions set in a simultaneous communication area in which said at least three base stations can simultaneously communicate with the mobile station;

deriving a sum of unsigned differences between two calculated wave emitting times in all combinations of two calculated wave emitting times obtained from at least three calculated wave emitting times for each of said plurality of representative points; and determining a position of the mobile station at one of said plurality of representative point at which said sum becomes minimum.

In the position determining method according to the invention, said step of measuring communication delay times from differences between the wave emitting time and the measured times of receipt in at least three base stations may be carried out at the communication control station or the wireless communication terminal. When the mobile station performs said calculation, said times of receipt measured by at least three base stations are received from these base stations directly or via the communication control station. Then, the mobile station can conduct the measurement of the communication delay times by processing these times of receipt as well as the wave emitting time stored in the mobile station.

Furthermore, in the method according to the invention, the above step of determining a position of the mobile station from the wave emitting time at which the radio wave is emitted by the wireless communication terminal of the mobile station may be carried out at the mobile station or base station via the communication control station. For instance, when the position determining step is performed at the mobile station, the times of receipt measured at respective base stations are collected by the communication control station, and then are transmitted to the mobile station. In this case, the mobile station can determine its own position. It should be noted that such a process may be carried out at respective base stations.

In a preferable embodiment of the position determining method according to the invention, the step of measuring the communication delay times from differences between the wave emitting time and the times of receipt at at least three base stations is performed at one or more base stations, and the step of determining a position of the mobile station from the times of receipt at the base stations is carried out by the communication control station. Then, the process can be distributed over the base station or stations and communication control station, and therefore a balance in a whole system is improved.

According to the invention, a position of the mobile station is determined a sum of unsigned differences between the measured wave emitting times is derived for respective representative points selected within the simultaneously communication area such that a desired position determining precision can be attained, and a position of a representative point which gives a minimum sum is selected as a position of the mobile station. The calculation is simplified and an amount of calculation is very small as compared with a case in which a complete solution is derived considering errors of the standard time in tie mobile station and base stations. According to the invention, an amount of calculation may be further reduced by repeating the process of deriving a position of the mobile station by seeking among a plurality of representative points, a representative point at which a sum of power of differences in the measured wave emitting times become minimum while a size of position calculation area containing a plurality of representative points is gradually reduced until a desired precision is obtained. In this case, said position calculation area is shaped in square and a length of its side is each time reduced by 0.75. Then, a precision of position detection can be further improved.

According to a second aspect of the invention, a method of determining a position of a wireless communication terminal in a wireless communication system including a plurality of mobile stations each having a wireless communication terminal installed therein, a plurality of base stations each being arranged at known positions on a plane and a communication control station controlling communication between said plurality of wireless communication terminals and said plurality of base stations, wherein (a) when a position of a mobile station could not be determined by a GPS method owing to a fact that the relevant mobile station does not have a GPS receiver or although the relevant mobile station has a GPS receiver, GPS radio waves could not be received, a position of the mobile station is determined by a base station method;

(b) when a position of a mobile station could not be determined by the base station method due to a fact that at least three base stations are not existent around the relevant mobile station, a position of the mobile station is determined by a GPS method; and (c) when a position of a mobile station could be determined by both the base station method and the GPS method, a position of the mobile station is determined by a hybrid method utilizing information obtained by the GPS method and information obtained by the base station method.

In this method according to the second aspect of the invention, when a position of a mobile station is determined by the base station method, it is preferable to adopt the method according to the first aspect of the invention although any other base station method may be utilized.

Furthermore, when a position of a mobile station could not be determined by both the GPS method and the base station method, it is judged that the determination of a position of the relevant mobile station is impossible. It is apparent that according to the invention, since both the GPS method and base station method are used, an occurrence of such undesired situation can be reduced.

DESCRIPTION OF THE PREFERRED EMBODIMENT

Figure 1:
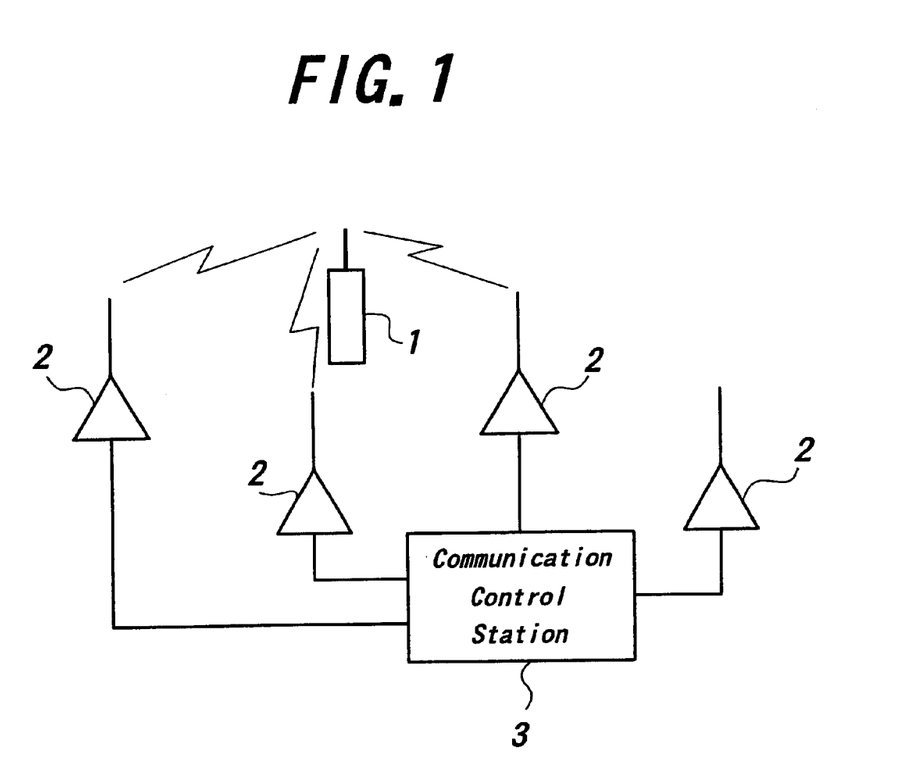
FIG. 1 is a schematic view showing a wireless communication system, to which the method of determining a position of a wireless communication terminal according to the first aspect of the invention is applied.

FIG. 1 is a schematic diagram showing a whole structure of a wireless communication system to which the position determining method according to the invention is applied. Around a mobile station 1 including a wireless communication terminal are arranged a plurality of base stations 2. Each of these base stations 2 has a function for measuring a time at which a radio wave emitted by the mobile station 1 is received. According to the invention, a position of the mobile station 1 is determined by comparing these times of receipt, and therefore in order to measure times of receipt, each of the base stations includes a time synchronizing device which is synchronized with a standard time. It should be noted that even if standard times in the base stations 3 are not identical, differences are known and are within a correctable range, there is no problem. Therefore, according to the invention, the base stations 3 are sufficient to be substantially synchronized with the real standard time.

As illustrated in FIG. 1, a plurality of base stations 2 are connected to a communication control station 3. In the present embodiment, this communication control station 3 has not only a function for controlling communication at the base stations 2 but also a function for performing calculation necessary for determining a position of the mobile station 1. According to the invention, this function of performing the calculation for determining a position of the mobile station 1 may be carried out in the base stations 2. In this case, a part of the functions of the communication control station 3 is taken over by the base stations 2.

Now the method of determining a position of a mobile station will be explained. It is first assumed that a specific radio wave is emitted by the mobile station 1 at a time TM, and the thus emitted wave is received by at least three base stations 2 at times Ti (i is respective base station numbers). Here, distances Ri from the mobile station 1 to respective base stations 2 may be expressed by the following equation (1), wherein C is a velocity of light.

$$Ri=C(Ti-TM) \quad (1)$$

All the base stations 2 have known positions (xi, yi). Then, a position (x, y) of the mobile station 1 may be represented as follows:

$$(x-xi)^2+(y-yi)^2=Ri^2 \quad (2)$$

From the above equations (1) and (2), the following equation (3) may be derived.

$$(x-xi)^2+(y-yi)^2=C^2(Ti-TM)^2 \quad (3)$$

In practice, the time in the mobile station 1 is not completely synchronized with the times in the base stations 2, and thus the times of receipt measured at respective base stations 2 contain synchronization error. Therefore, the wave emitting time TM in the mobile station 1 is unknown. However, it should be noted that the time synchronization is established in a plurality of base stations 2 by means of well-known time synchronizing devices.

Squares of right and left terms of the equation (3) are derived and all unknown parameters are placed in the left term. Then, the following equation (4) is obtained.

$$[(x-xi)^2+(y-yi)^2]^{1/2}+CTM=CTi \quad (4)$$

By dividing right and left terms by C, the following equation (5) may be derived.

$$[(x-xi)^2+(y-yi)^2]^{1/2}/C+TM=Ti \quad (5)$$

In this equation (5), $[(x-xi)^2+(y-yi)^2]^{1/2}/C$ represents a communication delay time. The equation (5) includes three unknown factors x, y and TM, and therefore a position (x, y) of the mobile station 1 can be determined by measuring times of receipt Ti at least three base stations 2.

In the GPS, a distance from a mobile station to a satellite serving as a base station is very long and is longer than 20,000 km, and therefore a position of the mobile station can be determined by a converging calculation after converting the above equation (5) by the Taylor expansion. However, in the portable telephone system, since a distance over which a mobile station moves during a time within which a position of the mobile station has to be renewed could not be ignored with respect to the distance from the mobile station to the base station, the simultaneous ternary quadratic equations must be solved. In this case, upon considering a fact that a precision of time synchronization in the base stations 2 is about 100 nano-seconds, and this error corresponds to an error in time of about 30 meters. That is to say, a cover area of the base station 2 is divided into a mesh having one side length of 10–20 meters, and a position of the mobile station 1 is determined as a cross point of the mesh, said cross point being termed as representative points in the present specification.

In the equation (5), the unknown factor TM has to be identical in the equations for respective base stations 2. That is to say, the following equation (6) may be obtained.

$$TMi=TM \text{ (i is a base station number)} \quad (6)$$

$$\text{wherein } TMi=Ti-[(x-xi)^2+(y-yi)^2]^{1/2}/C \quad (7)$$

The above equation (6) is satisfied only when no error is existent in the measurement of times of receipt. Therefore, it is judged whether or not a cross point can be derived as a position of the mobile station by deriving a case in which differences in the unknown TMi for respective base stations become minimum. That is to say, according to the invention, a position of the mobile station is determined as a representative point at which a sum of unsigned differences between the times of receipt in all possible combinations of two times of receipt obtained for respective base stations becomes minimum. In the present embodiment, a difference D in unknown TMi for respective base stations is derived as a sum of squares of the differences in a pair of times of receipt as represented by the following equation (8).

$$D=\Sigma\Sigma(dij)^2, i<j \quad (8)$$

wherein dij=TMi−TMj

The above mentioned difference D is calculated for all cross points within the communication area in accordance with the equation (8), and a cross point which gives a minimum difference D is determined as a point of the mobile station 1. In this manner, according to the invention, an amount of calculation can be materially reduced as compared with a case in which a complete solution is derived as shown by the equation (5) considering an occurrence of error. For instance, if the cover area having a size of 1000 m×1000 m is divided into grids having a size of 10 m, it is sufficient to calculate the difference D for 10000 cross points.

Another embodiment of the method according to the invention, in which the above calculation can be further simplified will be explained. In this embodiment, by utilizing a fact that a sole minimum value of a variation of the position (x, y) of the mobile station 1 is identical with a minimum value to be derived.

Figure 2:
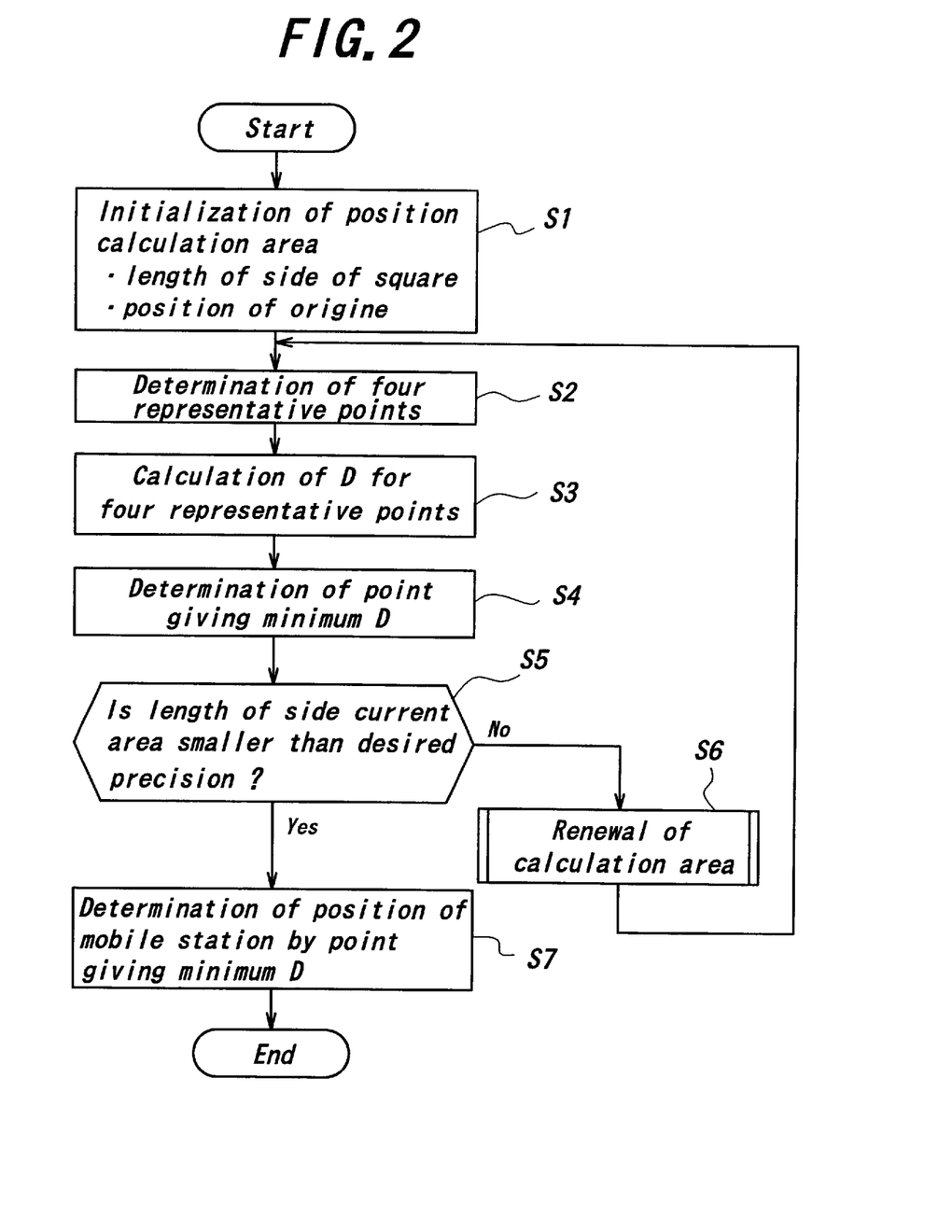
FIG. 2 is a flow chart representing successive steps of the position determining method according to the invention.
Figure 3:
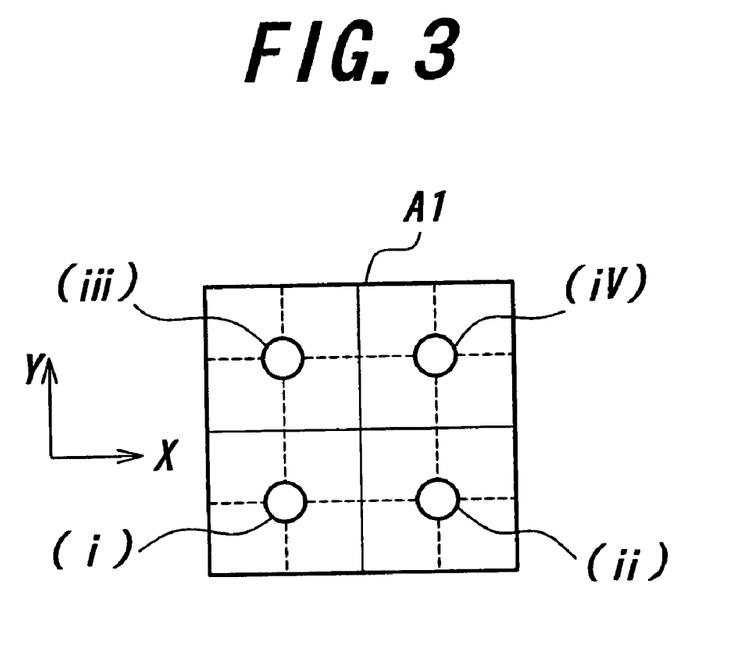
FIGS. 3, 4 and 5 are schematic diagrams explaining the operation in several steps.
Figure 4:
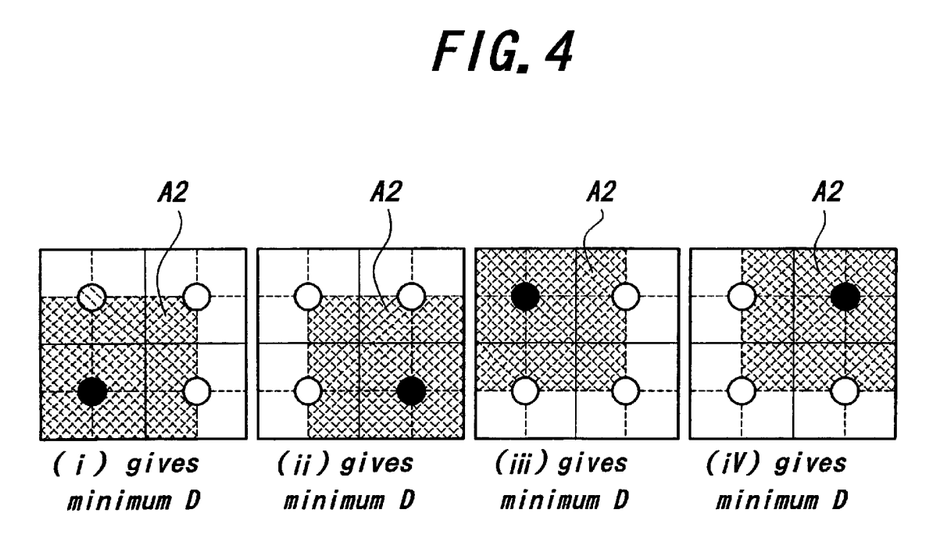
Figure 5:
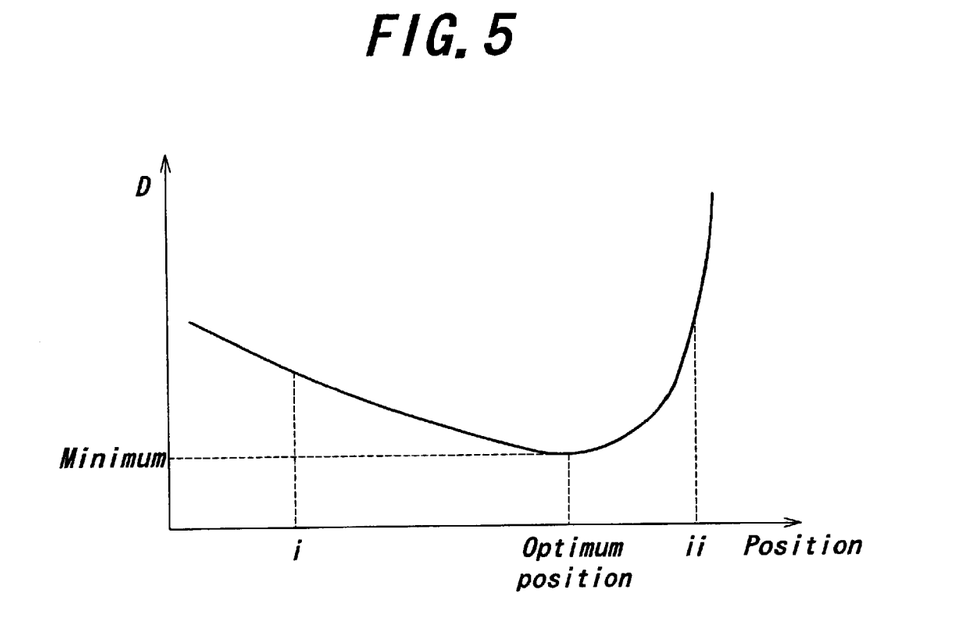

FIG. 2 is a flow chart showing successive steps of the operation in the present preferable embodiment, and FIGS. 3–5 are diagrams for explaining its process. In the following explanation, the cover area of a base station is assumed to be square, but it may be any shape having at least four representative points. At first, in a step S1, a position calculation area is initialized in accordance with the shape of the cover area of a base station. In the explanation, both the cover area of a base station and a position calculation area are square. Therefore, in the initializing step S1, a length L a side of the position calculation area and coordinates (0, 0) of an origin (a left lower corner of square) are preset. In a next step S2, a plurality of representative points, in the embodiment shown in FIG. 3, four points (i), (ii), (iii) and (iv) are determined within the thus initialized position calculation area A1. Positions of these representative points are separated from corresponding sides of the position calculation area A1 by a quarter of the side length L of the square position calculation area. Therefore, coordinates of the representative point (i) are (0.25 L, 0.25 L).

Then, in a step S3, the difference D is calculated for all the representative points in accordance with the equation (8), and further in a step S4, a representative point is derived which gives a minimum difference D. Subsequently, in a step S5, the length L of a side of the position calculation area A1 is compared with a required precision in the position determination. If it is judged "Yes", the above representative point which gives a minimum difference D is selected as a position of the mobile station 1 in a step S6.

If the judgement in the step S5 is "No", in a step S6, a new position calculation area A2 is established on the basis of the representative point which gives the minimum difference D. FIG. 4 shows this establishment of a new position calculation area. The origin is shift, if necessary, and a new position calculation area A2 having a side length which is smaller than a side length L of the previous position calculation area A1 by 0.75 times. Therefore, the new position calculation area A2 has a side length of 0.75 L. For instance, if the representative point (i) gives a minimum value of D, the origin is not shifted, but a new position calculation area A2 having a side length of 0.75 L as illustrated in a left hand side of FIG. 4. If the representative point (ii) gives the minimum value of D, the origin is shifted rightward by a distance of 0.25 L to establish a new position calculation area A2 having a side length of 0.75 L. If the representative point (iii) gives the minimum D, the origin is shifted upward over a distance of 0.25 L, and if the representative point (iv) gives the minimum value of D, the origin is shifted rightward as well as upward over a distance 0.25 L as shown in the right hand portion of FIG. 4.

After establishing a new position calculation area A2 in the above step S6, the process is returned to the step S2, and four representative points are newly set in the new position calculation area A2. For instance, if the representative point (i) within the position calculation area A1 gives a minimum value of difference D and the new position calculation area A2 shown in the left hand portion of FIG. 4 is newly established. A new representative point is set within this position calculation area A2 at a left lower point having coordinates of (0.75 L/4, 0.75 L/4). Next, in the step S3, values of D are calculated for respective four representative points within the area A2, and in the step S4, a representative point which gives a minimum value of D is determined. Then, in the step S5, a length 0.75 L of a side of the square position calculation area A2 is compared with the required precision.

In the manner explained above, the process of determining a representative point giving a minimum value of D is repeated each time a length of a side of a position calculation area is reduced by 0.75 until a length of a side of a position calculation area becomes equal to or smaller than a required precision in determining a position of a mobile station. Then, finally in the step S7, a position of the mobile station 1 is determined.

In the embodiment just explained above, a length of a side of a position calculation area is reduced by 0.75 each time a new position calculation area is established. FIG. 5 is a graph showing a variation of the difference D between the representative point (i) and the representative point (ii). Within the cover area of base stations, a sole point is existent at which a local minimum is identical with a minimum. Therefore, if the difference D at the representative point (i) is smaller than the difference D at the representative point (ii), a point giving a minimum difference D within the cover area of base stations could not be existent beyond the representative point (ii) viewed from the origin, but there is a possibility that a point giving a minimum difference D within the cover area is existent between the representative point (i) and the representative point (ii) and closer to the representative point (ii). The same is applied to the remaining representative points (iii) and (iv), and therefore although the representative point (i) gives a minimum value of D among four representative points, it is much more safety to establish a new position calculation area such that the newly established area contains the remaining three representative points on its boundary.

As explained above, since a length of a side of a square position calculation area is reduced by 0.75 each time a new position calculation area is established, a position of a mobile station can be determined with a precision of 10 meters by repeating the calculation at most twenty times for the service area of base stations having a square shape with a side of 1000 meters. That is to say, it is sufficient to calculate the difference D for only eighty representative points. Then, an amount of calculation and judgement can be reduced by 100 times as compared with a case in which the calculation of the difference D and judgement are carried out for 10000 representative points.

As explained above, in the base station used in the method of determining a position of a mobile station according to the invention, there is provided a time synchronizing device for measuring a time at which the relevant base station receives the radio wave emitted by the mobile station. This time synchronizing device may be a highly precise time standard device such as atomic clock, a device which can utilize a highly precise external standard time such as GPS device or a device for correcting a non-synchronized time with the aid of previously measured communication delay times between base stations.

Next a limitation of arranging base stations will be explained. In the method according to the invention, it is necessary to measure times at which a radio wave emitted by a mobile station is received by at least three base stations. However, it these at least three base stations are aligned linearly, it is impossible to determine a position of the mobile station situating on an aligning line. In this case, unless a wave emission time at the mobile station is specified, a position of the mobile station could not be determined. If one or more base stations are existent besides the aligning line, a position of the mobile station can be determined. Therefore, it is preferable to arrange base stations such that they surround the cover area of the base stations. If the mobile station is out of a boundary of a polygon formed by a plurality of base stations which serve to determine a position of the mobile station, an influence of an error in the measurement of times of receipt to the position determining precision becomes large upon an increase in a distant from the mobile station and a base station. Therefore, it is not preferable to arrange base stations closer to each other although the cover area of base stations could be realized easily.

Figure 6:
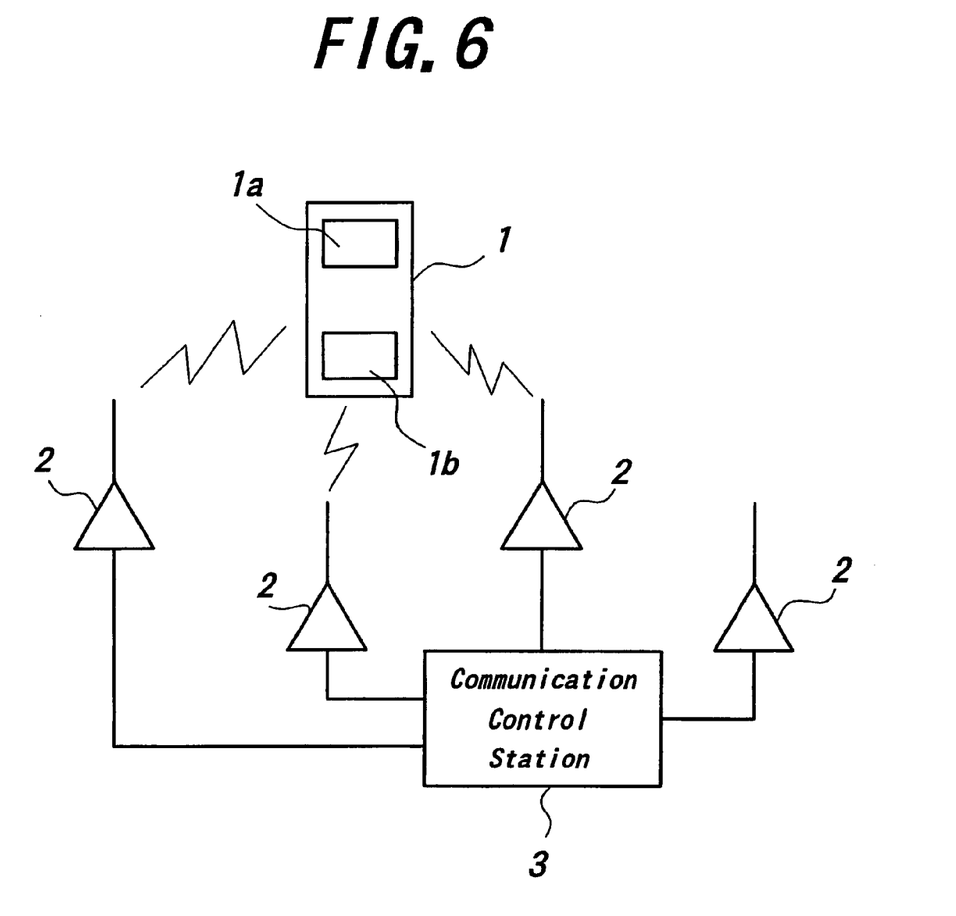
FIG. 6 is a block diagram of a wireless communication system to which the position determining method according to the second aspect of the invention is applied.

FIG. 6 is a block diagram showing a wireless communication system to which the position determining method according to the second aspect of the invention is applied. In this wireless communication system, a mobile station 1 includes a wireless communication terminal 1a and a GPS receiver 1b. These wireless communication terminal 1a and GPS receiver 1b may have their own areas or may be a common area. The construction and function of base stations 2 and communication control station 3 shown in FIG. 6 are identical with those illustrated in FIG. 1.

In case of determining a position of a mobile station, the following three situations may arise.

(a) A position of a mobile station could not be determined owing to a fact that the relevant mobile station does not have a GPS receiver is to be determined or although the relevant mobile station has a GPS receiver, GPS radio waves could not be received because the mobile station is in buildings, underground or tunnels.

(b) A position of a mobile station could not be determined by the base station system due to a fact that at least three base stations are not existent around the relevant mobile station.

(c) A position of a mobile station could be determined by both the base station method and the GPS method.

It should be noted that the manner of determining a position of a mobile station by the GPS method has been well known, and therefore its explanation is dispensed with. In the case (a), a position of the relevant mobile station is determined by the base station method; in the case (b), a position of the relevant mobile station is determined by the GPS method; and in the case (c), a position of the relevant mobile station is determined by a hybrid method, in which a position of the mobile station is determined by the base station method by utilizing information obtained by GPS method. The information obtained in the GPS method contains DOP (Dilution of Precision) which represents a degree of a precision of positioning due to an arrangement of GPS satellites used in the position measurement. In the present embodiment, an index representing a positioning precision such as the DOP contained in the GPS information is utilized to set the above mentioned four representative points in the method of determining a position of a mobile station in accordance with the base station method such that said four representative points are within a predictable error range represented by the DOP. According to the invention, such an index for representing a precision of positioning may be moving situation of a mobile station, information obtained experimentally or experientially from behavior of positioning solutions.

Figure 7:
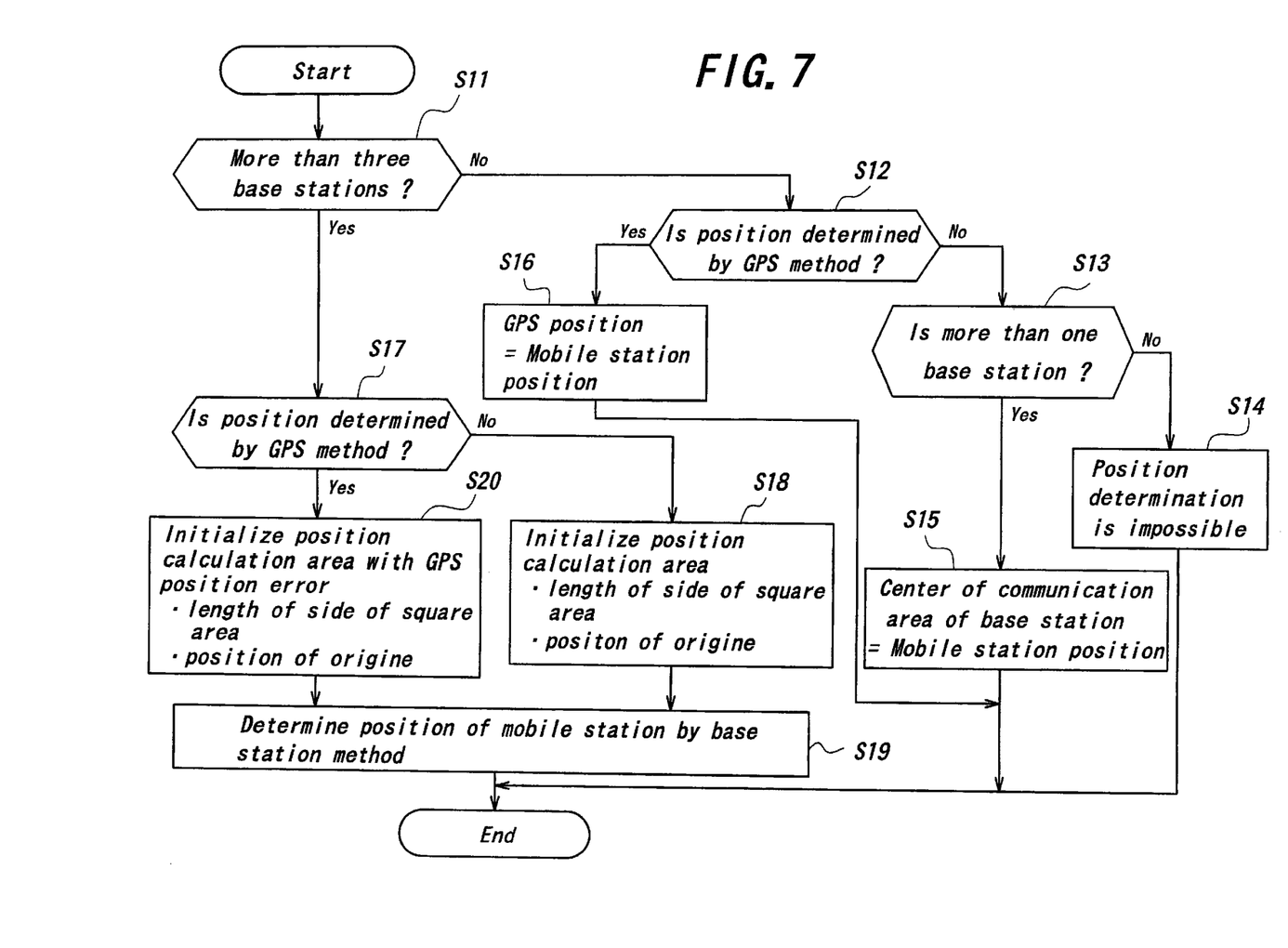
FIG. 7 is a flow chart expressing successive steps in the position determining method according to the second aspect of the invention.

FIG. 7 is a block diagram depicting a flow chart of the method of determining a position of a mobile station according to the second aspect of the invention. In a step S11, it is judged whether or not a radio wave emitted by a mobile station can be received by at least three base stations, i.e. whether or not a position of a mobile station can be determined by the base station method. If "No", it is further judged whether or not a position of the mobile station can be determined by the GPS method in a step S12. If "No", then it is judged whether or not the radio wave is received by at least one base station in a step S13. If "No", it is judged that a position of the mobile station could not be determined in a step S14 and the process is ended. On the contrary, if "Yes" in the step S13, it is judged in a step S15 that the relevant mobile station is positioned at a center of a communication area of one or two base stations which received the radio wave. If two base stations are judged to receive the radio wave, a center of an overlapped area between two communication areas of these base stations is determined as a position of the mobile station.

If "Yes" is judged in the step S11, it is judged whether or not a position of the mobile station can be determined by the GPS method in a step S17. If "No", initial values of the position calculation area are set in the cover area of base stations in a step S18 which is identical with the step S2 shown in FIG. 2. Then, in a step S19 containing the steps S2–S7 in the flow chart shown in FIG. 2, a position of the relevant mobile station is determined. If it is judged in the step S17 that a position of the mobile station can be determined by the GPS method, an error range in the position estimation obtained by the GPS method is initialized in the position calculation area to denote four representative points in a step S20. Then, in the step S19, the calculation is performed for these representative points to determine a position of the mobile station.

The present invention is not limited to the embodiments explained above, but many alternations and modifications may be conceived by a person skilled in the art within the scope of the invention. In the above explained first embodiment, a position of a mobile station is determined by a sum of unsigned differences D as a sum of squares of differences. According to the invention, a sum of unsigned differences D may be obtained as a sum of absolute values of differences D. Furthermore, in the above embodiment according to the second aspect of the invention, a position of a mobile station is determined by the base station method in accordance with the embodiment shown in FIG. 2 of the first aspect of the invention. However, according to the second aspect of the invention, a position of a mobile station may be determined by another base station method. Moreover, in the embodiment shown in FIG. 7, when a position of a mobile station can be determined by both the base station system and the GPS method, the hybrid method is used to determine a position of the mobile station, in said hybrid method the representative points in the base station method are set within an error range of the position obtained by the GPS method. But according to the invention, a position of a mobile station determined by the base station method may be confirmed by a position of the mobile station obtained by the GPS method.

As explained above in detail, according to the first aspect of the invention, an amount of calculation can be materially reduced and a position of a mobile station can be easily determined as compared with the known method in which a complete solution is obtained considering error in times in base stations.

Furthermore, by repeating the operation for seeking a representative point giving a minimum value of D each time a size of the position calculation area is gradually decreased until a required precision is attained, a position of a mobile station can be further efficiently determined with a smaller amount of calculation.

According to the invention, a plurality of base stations are distributed with a lower density such that at least three base stations have an overlapped cover area, and therefore a cost of constructing base stations can be reduced. Furthermore, although the measurement of distance includes errors, a position of a mobile station is determined within the cover area of base stations, a position of a mobile station can be stably determined.

According to the second aspect of the invention, a position of a mobile station can be precisely determined within a wide area, and therefore base stations can be distributed with a low density. Moreover, a position of a mobile station can be determined under various situations, and therefore a utility of a mobile station can be enhanced.

What is claimed is:

1. A method of determining a position of a wireless communication terminal in a wireless communication system including a plurality of mobile stations each having a wireless communication terminal installed therein, a plurality of base stations each being arranged at known positions on a plane and a communication control station controlling communication between said plurality of wireless communication terminals and said plurality of base stations, comprising the steps of:

measuring times of receipt at which a radio wave emitted by a wireless communication terminal provided in a mobile station whose position is to be determined are received by at least three base stations which are substantially synchronized with a standard time;

deriving calculated wave emitting times for each of said at least three base stations by replacing a position of the mobile station in equations by a plurality representative positions within a position calculation area set in a simultaneous communication area in which said at least three base stations can simultaneously communicate with the mobile station, said equations being obtained by modifying equations in which products of a velocity of light and differences between an actual wave emitting time at which the radio wave is emitted from the wireless communication terminal of the mobile station and said measured times of receipt become equal to distances between said mobile station and said at least three base stations;

deriving a sum of unsigned differences between two calculated wave emitting times in all combinations of two calculated wave emitting times obtained from at least three calculated wave emitting times for each of a plurality of representative points; and determining a position of the mobile station at one of said plurality of representative points at which said sum becomes minimum.

2. A method according to claim 1, wherein said step of deriving the calculated wave emitting times is performed by initializing the position calculation area having a predetermined shape and a size, setting said representative points (xi, yi) within the position calculation area, calculating communication delay times at respective representative points from $[(x-xi)^2+(y-yi)^2]^{1/2}/C$, wherein (x, y) denotes a position of the mobile station and C is a velocity of light, and calculating the calculated wave emitting times TMi as differences between the times of receipt Ti and the communication delay times.

3. A method according to claim 2, wherein said step of measuring the communication delay times from differences between the wave emitting time at the mobile station and the times of receipt at the base stations is performed at the communication control station or at the wireless communication terminal.

4. A method according to claim 2, wherein said step of determining a position of the mobile station is performed at the mobile station or at least one of said base stations while information is transmitted to the mobile station or at least one of said base stations through the communication control station.

5. A method according to claim 2, wherein said step of measuring the communication delay times from differences between the wave emitting time and the times of receipt and the step of determining a position of the mobile station are performed at both the base stations and the communication control station.

6. A method according to claim 2, wherein a function of the communication control station is performed by the base stations.

7. A method according to claim 2, wherein said sum of unsigned differences between two calculated wave emitting times in all combinations of two calculated wave emitting times obtained from at least three calculated wave emitting times is derived for all representative points which are distributed such that a required precision is satisfied.

8. A method according to claim 7, wherein said step of determining a position of the mobile station as a representative point at which the difference D becomes minimum is repeated each time a size of the position calculation area is reduced until a size of the position calculation area becomes not larger than the required precision.

9. A method according to claim 8, wherein said position calculation area is set to be a square shape, and a length of a side of the square position calculation area is reduced by 0.75 each time the position determining process is repeated.

10. A method according to claim 2, wherein said sum of unsigned differences between two calculated wave emitting times in all combinations of two calculated wave emitting times obtained from at least three calculated wave emitting times for each of said plurality of representative points are performed by deriving a sum of squares of unsigned differences.

11. A method according to claim 2, wherein said sum of unsigned differences between two calculated wave emitting times in all combinations of two calculated wave emitting times obtained from at least three calculated wave emitting times for each of said plurality of representative points is derived by making a sum of absolute values of unsigned differences.

12. A method of determining a position of a wireless communication terminal in a wireless communication system including a plurality of mobile stations each having a wireless communication terminal installed therein, a plurality of base stations each being arranged at known positions on a plane and a communication control station controlling communication between said plurality of wireless communication terminals and said plurality of base stations, wherein (a) when a position of a mobile station could not be determined by a GPS method owing to a fact that the relevant mobile station does not have a GPS receiver or although the relevant mobile station has a GPS receiver, GPS radio waves could not be received, a position of the mobile station is determined by a base station method;

(b) when a position of a mobile station could not be determined by the base station method due to a fact that at least three base stations are not existent around the relevant mobile station, a position of the mobile station is determined by the GPS method; and (c) when a position of a mobile station could be determined by both the base station method and the GPS method, a position of the mobile station is determined by a hybrid method utilizing, information obtained by the GPS method and information obtained by the base station method.

13. A method according, to claim 12, wherein a step of determining a position of a mobile station by the base station method comprises the steps of:

measuring times of receipt at which a radio wave emitted by a wireless communication terminal provided in a mobile station whose position is to be determined are received by at least three base stations which are substantially synchronized with a standard time;

modifying equations in which products of a velocity of light and differences between an actual wave emitting time at which the radio wave is emitted from the wireless communication terminal of the mobile station and said measured times of receipt become equal to distances between said mobile station and said at least three base stations, into equations by means of which, calculated wave emitting times are derived for each of said at least three base stations by replacing a position of the mobile station by a plurality representative positions set in a simultaneous communication area in which said at least three base stations can simultaneously communicate with the mobile station;

deriving a sum of unsigned differences between two calculated wave emitting times in all combinations of two calculated wave emitting times obtained from at least three calculated wave emitting times for each of said plurality of representative points; and determining a position of the mobile station at one of a plurality of representative points at which said sum becomes minimum.

14. A method according to claim 13, wherein said step of deriving the calculated wave emitting times is performed by initializing the position calculation area having a predetermined shape and a size, setting said representative points (xi, yi) within the position calculation area, calculating communication delay times at respective representative points from $[(x-xi)^2+(y-yi)^2]^{1/2}/C$, wherein (x, y) denotes a position of the mobile station and C is a velocity of light, and calculating the calculated wave emitting times TMi as differences between the times of receipt Ti and the communication delay times.

15. A method according to claim 14, wherein said hybrid method is carried out such that said representative points in the base station method are set within an position estimation error range in the GPS method.

16. A method according to claim 14, wherein a step of measuring communication delay times from differences between the wave emitting time at the mobile station and the times of receipt at the base stations is performed at the communication control station or at the wireless communication terminal.

17. A method according to claim 14, wherein said step of determining a position of the mobile station is performed at the mobile station or at least one of said base stations while information is transmitted to the mobile station or at least one of said base stations through the communication control station.

18. A method according to claim 14, wherein a process of measuring communication delay times from differences between the wave emitting time and the times of receipt and a process of determining a position of the mobile station are performed at both the base stations and the communication control station.

19. A method according to claim 14, wherein a function of the communication control station is replaced by the base stations.

20. A method according to claim 14, wherein said sum of unsigned differences between two calculated wave emitting times in all combinations of two calculated wave emitting times obtained from at least three calculated wave emitting times is derived for all representative points which are distributed on the plane such that the required precision is satisfied.

21. A method according to claim 20, wherein said process of determining a position of the mobile station as a representative point at which the difference D becomes minimum is repeated each time a size of the position calculation area is reduced until a size of the position calculation area becomes not larger than the required precision.

22. A method according to claim 21, wherein said position calculation area is set to be a square shape, and a length of a side of the square position calculation area is reduced by 0.75 each time the position determining process is repeated.

23. A method according to claim 14, wherein said sum of unsigned differences between two calculated wave emitting times in all combinations of two calculated wave emitting times obtained from at least three calculated wave emitting times for each of said plurality of representative points is derived by making a sum of squares of unsigned differences.

24. A method according to claim 14, wherein said sum of unsigned differences between two calculated wave emitting times in all combinations of two calculated wave emitting times obtained from at least three calculated wave emitting times for each of said plurality of representative points is derived by making a sum of absolute values of unsigned differences.

* * * * *